United States Patent
Ahuja et al.

(10) Patent No.: US 10,320,662 B1
(45) Date of Patent: Jun. 11, 2019

(54) CENTRALIZED RESOURCE ROUTING AND DISTRIBUTION

(71) Applicant: BANK OF AMERICA CORPORATION, Charlotte, NC (US)

(72) Inventors: Anand Ahuja, Hoboken, NJ (US); Alfred James Reed, Huntersville, NC (US); Joe Nathan Lamar, III, Lithia Springs, GA (US); Ayeesha Sachedina, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 7 days.

(21) Appl. No.: 15/816,798

(22) Filed: Nov. 17, 2017

(51) Int. Cl.
| | |
|---|---|
| *G06F 15/173* | (2006.01) |
| *H04L 12/717* | (2013.01) |
| *H04L 12/911* | (2013.01) |
| *H04L 29/06* | (2006.01) |
| *H04L 12/66* | (2006.01) |
| *H04L 29/08* | (2006.01) |

(52) U.S. Cl.
CPC ............. *H04L 45/42* (2013.01); *H04L 12/66* (2013.01); *H04L 47/70* (2013.01); *H04L 63/08* (2013.01); *H04L 63/102* (2013.01); *H04L 67/20* (2013.01)

(58) Field of Classification Search
USPC ........ 709/238, 203, 205; 370/392, 393, 252; 705/38; 713/165
See application file for complete search history.

(56) References Cited

U.S. PATENT DOCUMENTS

| | | | |
|---|---|---|---|
| 6,752,313 B1 | 6/2004 | Caviles et al. | |
| 7,032,031 B2* | 4/2006 | Jungck | H04L 29/12066 709/203 |
| 7,110,969 B1 | 9/2006 | Bennett et al. | |
| 7,114,008 B2* | 9/2006 | Jungck | H04L 47/10 709/205 |
| 7,440,915 B1 | 10/2008 | Ulrich | |
| 7,676,431 B2 | 3/2010 | OLeary et al. | |
| 7,680,735 B1 | 3/2010 | Loy | |
| 7,680,737 B2 | 3/2010 | Smith, Jr. et al. | |
| 7,693,783 B2 | 4/2010 | Balasubramanian et al. | |
| 7,801,814 B2 | 9/2010 | Cataline et al. | |
| 7,822,656 B2 | 10/2010 | Knight et al. | |
| 7,822,688 B2 | 10/2010 | Labrou et al. | |
| 8,001,025 B2 | 8/2011 | Vadhri | |

(Continued)

*Primary Examiner* — Thanh T Nguyen
(74) *Attorney, Agent, or Firm* — Michael A. Springs; Moore & Van Allen PLLC; Jeffrey R. Gray

(57) ABSTRACT

The centralized resource routing and distribution improves upon the routing of interactions and distribution of resources for interactions between users and operator entities. A centralized gateway is provided through which interactions may be routed and resources distributed using one or more substitute interfaces. The one or more substitute interfaces may mimic interfaces of the operator, or otherwise provide a universal interface for use of multiple resource pools for the interactions. Use of the gateway and substitute interfaces increases processing capacity, reduces memory requirements, and/or improves processing time for both the operator entities and the organization entities since it provides for centralized routing and distribution for multiple operator entities without the operator entities having to store and/or process user information or the interactions associated therewith.

20 Claims, 6 Drawing Sheets

(56) References Cited

U.S. PATENT DOCUMENTS

| | | |
|---|---|---|
| 8,005,754 B2 | 8/2011 | McCoy et al. |
| 8,010,424 B1 | 8/2011 | Hamilton et al. |
| 8,121,945 B2 | 2/2012 | Rackley, III et al. |
| 8,140,429 B2 | 3/2012 | Balasubramanian et al. |
| 8,254,658 B2 | 8/2012 | Hamilton |
| 8,255,324 B2 | 8/2012 | Bercy et al. |
| 8,285,641 B2 | 10/2012 | Cataline et al. |
| 8,290,862 B2 | 10/2012 | Sheehan et al. |
| 8,328,095 B2 | 12/2012 | Oder, II et al. |
| 8,407,140 B2 | 3/2013 | Ayala et al. |
| 8,473,324 B2 | 6/2013 | Alvarez et al. |
| 8,645,266 B2 | 2/2014 | Balasubramanian et al. |
| 8,650,118 B2 | 2/2014 | Balasubramanian et al. |
| 8,875,990 B2 | 11/2014 | Bishop et al. |
| 8,924,294 B2 | 12/2014 | Lynch et al. |
| 9,367,753 B2 | 6/2016 | Li et al. |
| 9,495,680 B2 | 11/2016 | Oder, II et al. |
| 9,691,278 B2 * | 6/2017 | Poornachandran .......................... G08G 1/096716 |
| 10,157,436 B2 * | 12/2018 | Samocha ............... G06Q 50/30 |
| 2003/0099237 A1 * | 5/2003 | Mitra ..................... H04L 45/00 370/393 |
| 2005/0065678 A1 * | 3/2005 | Smith .................... G06Q 10/00 701/31.4 |
| 2006/0161604 A1 * | 7/2006 | Lobo ................. G06F 17/30067 |
| 2009/0262741 A1 * | 10/2009 | Jungck ............. H04L 29/12066 370/392 |
| 2010/0103837 A1 * | 4/2010 | Jungck ............. H04L 29/12066 370/252 |
| 2010/0280909 A1 | 11/2010 | Zhang et al. |
| 2011/0270733 A1 | 11/2011 | Chazen |
| 2012/0233066 A1 | 9/2012 | Vallabhaneni |
| 2013/0163746 A1 * | 6/2013 | Wick .................. H04M 3/5166 379/265.14 |
| 2013/0173437 A1 | 7/2013 | Capparell et al. |
| 2014/0201070 A1 | 7/2014 | Liberty |
| 2014/0214649 A1 | 7/2014 | DuCharme et al. |
| 2014/0244500 A1 | 8/2014 | Elias |
| 2014/0279404 A1 * | 9/2014 | Kallimani ............ G06Q 40/025 705/38 |
| 2014/0297520 A1 | 10/2014 | Levchin et al. |
| 2014/0372751 A1 * | 12/2014 | Silverstone ............. G06F 21/60 713/165 |
| 2015/0032605 A1 | 1/2015 | Williams et al. |
| 2016/0055583 A1 | 2/2016 | Liberty et al. |
| 2016/0086184 A1 | 3/2016 | Carpenter et al. |
| 2016/0110721 A1 | 4/2016 | Russell et al. |
| 2016/0232518 A1 | 8/2016 | Butler |
| 2016/0247037 A1 | 8/2016 | Li et al. |
| 2016/0328711 A1 | 11/2016 | Elischer |
| 2017/0032352 A1 | 2/2017 | Koeppen et al. |
| 2017/0091791 A1 * | 3/2017 | Srinivasan ......... G06Q 30/0202 |
| 2017/0091873 A1 | 3/2017 | Cole et al. |
| 2017/0109717 A1 | 4/2017 | Vafeas |
| 2017/0169420 A1 | 6/2017 | Setlur et al. |
| 2017/0178126 A1 | 6/2017 | Liu et al. |
| 2018/0129945 A1 * | 5/2018 | Saxena ................... G06Q 20/02 |
| 2018/0129952 A1 * | 5/2018 | Saxena .................... G06N 5/04 |
| 2018/0129953 A1 * | 5/2018 | Saxena ................... G06N 5/048 |
| 2018/0129954 A1 * | 5/2018 | Saxena ............. G06F 17/30958 |
| 2018/0129955 A1 * | 5/2018 | Saxena ................... G06N 5/048 |
| 2018/0129956 A1 * | 5/2018 | Saxena ................... G06N 5/048 |
| 2018/0129957 A1 * | 5/2018 | Saxena ............. G06F 17/30958 |
| 2018/0129958 A1 * | 5/2018 | Saxena ............. G06F 17/30958 |
| 2018/0143975 A1 * | 5/2018 | Casal ................. G06F 17/2785 |
| 2018/0165416 A1 * | 6/2018 | Saxena ................ G06Q 10/063 |
| 2018/0165585 A1 * | 6/2018 | Saxena ................... G06N 5/041 |
| 2018/0165586 A1 * | 6/2018 | Saxena ................... G06F 17/30 |
| 2018/0165588 A1 * | 6/2018 | Saxena ................... G06F 19/324 |
| 2018/0165598 A1 * | 6/2018 | Saxena ................. G06N 99/005 |
| 2018/0165611 A1 * | 6/2018 | Saxena ............. G06Q 10/0631 |
| 2018/0165612 A1 * | 6/2018 | Saxena ............. G06Q 10/0631 |
| 2018/0165758 A1 * | 6/2018 | Saxena ................... G06Q 40/00 |
| 2018/0247544 A1 * | 8/2018 | Mustafic ............. G08G 5/0069 |

\* cited by examiner

CENTRALIZED RESOURCE ROUTING AND DISTRIBUTION

FIELD

The present invention relates to centralization of resource routing and distribution, and more particularly to improving the processing capability, memory, and processing speed of the systems that are utilized to route and distribute resources.

BACKGROUND

Resource routing and distribution is typically handled by each operator entity. That is each operator entity is responsible for interacting with users and providing routing and distribution options for interactions. These routing and distribution methods result in reduced processing capacity, increase memory requirements, and reduce the processing speed needed for interactions between various parties. Improved systems, processes, and computer program products are needed to increase the processing capacity, reduce memory requirements, and increase the processing speed associated with routing interactions between parties.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein that provide for improving the routing of interactions and distribution of resources for the interactions between users and operator entities. The present invention provides a centralized gateway through which interactions may be routed and resources distributed using one or more substitute interfaces. The one or more substitute interfaces may mimic interfaces of the operator, or otherwise provide a universal interface for use of multiple resource pools for the interactions. The present invention allows an operator entity to utilize the centralized gateway and substitute interfaces provided by the organization to handle routing and processing interactions between the user and the operator entity, without the operator having to store routing and distribution information and/or without the operator having to manage user or interaction information. The present invention increases processing capacity, reduces memory requirements, and/or improves processing time for both the operator entities and the organization entities since the present invention provides for centralized routing and distribution for multiple operator entities without the operator entities having to store and/or process user information or the interactions associated therewith.

Embodiments of the invention comprise systems, computer implemented methods, and computer products for centralized resource routing and distribution. The invention comprises receiving an interaction notification for an interaction between a user and an operator entity, wherein the interaction notification is received through one or more operator entity systems. The invention further comprises receiving a selection indication that the user would like to utilize a resource pool of a resource entity for the interaction. Next the invention determines a resource pool interface, including at least required resource pool information for entering into the interaction using the resource pool, wherein the resource pool information is determined from a resource pool database or from communicating with one or more resource entity systems. The invention also displays the resource pool interface with the required resource pool information for the resource pool, wherein the resource pool interface is provided to the operator entity in place of one or more operator interfaces, and wherein the resource pool interface is provided through the one or more operator entity systems for display to the user on a user computer system or on the one or more operator entity systems. The invention further comprises receiving the required resource pool information for the resource pool, and authenticating the user for the resource pool, wherein the authentication occurs by accessing a user authentication database or by communicating with the one or more resource entity systems. The invention also includes determining routing of the interaction for the resource pool based on a routing factor, and completing the interaction between the user, the operator entity, and the resource entity.

In further accord with embodiments, the invention comprises providing a resource selection interface to the user, wherein the resource selection interface is provided for the operator entity in place of the one or more operator interfaces, and wherein the resource pool interface is provided through the one or more operator entity systems for display to the user on the user computer system or on the one or more operator entity systems. The invention further comprises providing resources distribution options for one or more resource pools or one or more resource entities in the resource selection interface to the user for the interaction.

In other embodiments of the invention, the one or more resource entities are one or more digital resource entities, and wherein receiving the selection indication that the user would like to utilize the resource pool for the interaction comprises receiving a selection of one of the one or more resource pools available through the one or more digital resource entities.

In still other embodiments of the invention, the interaction is one of a plurality of interactions that the operator entity has entered into with a plurality of users that utilize a plurality of resource entities. The invention further comprises aggregating the plurality of interactions and a plurality of interaction information for the plurality of interactions with the plurality of resource entities into a report, and sending the report to the operator entity, wherein the report is provided through the one or more operator entity systems.

In yet other embodiments, the invention further comprises identifying one or more resource pools or one or more resource entities that the operator entity would like to offer to a plurality of users. The invention further comprises creating one or more substitute interfaces for the operator entity to present to the plurality of users in place of the one or more operator interfaces, wherein the one or more substitute interfaces at least comprise the resource pool interface.

In further accord with embodiments of the invention, the one or more substitute interfaces comprise one or more mimic interfaces, wherein the one or more mimic interfaces mimic the one or more operator interfaces provided by the operator entity.

In other embodiments of the invention, the one or more substitute interfaces comprise one or more universal interfaces, wherein the one or more universal interfaces are utilized by the operator entity through the operator entity systems.

In still other embodiments, the invention further comprises determining one or more routing factors for the routing of the interaction to the one or more resource entities, and storing the one or more routing factors in a routing engine.

In yet other embodiments of the invention, the one or more routing factors comprise one or more operator entity conditions, wherein the one or more operator entity conditions are preferred routings of routing channels of the operating entity. The routing factors may further comprise one or more organization entity conditions, wherein the one or more organization entity conditions are preferred routings of the routing channels of an organization performing the routing. The routing factors may also comprise one or more acceptance factors, wherein the one or more acceptance factors comprise likelihood of acceptance of the interaction using the routing channels. The routing factors may comprise one or more security factors, wherein the security factor comprises security level of the routing channels. The routing factors may further comprise one or more expenditure factors, wherein the one or more expenditure factors comprise expenditure levels for the operating entity or the organization entity based on the routing channels. The routing factor may also comprise one or more speed factors, wherein the speed factor comprises the speed of the routing channels.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
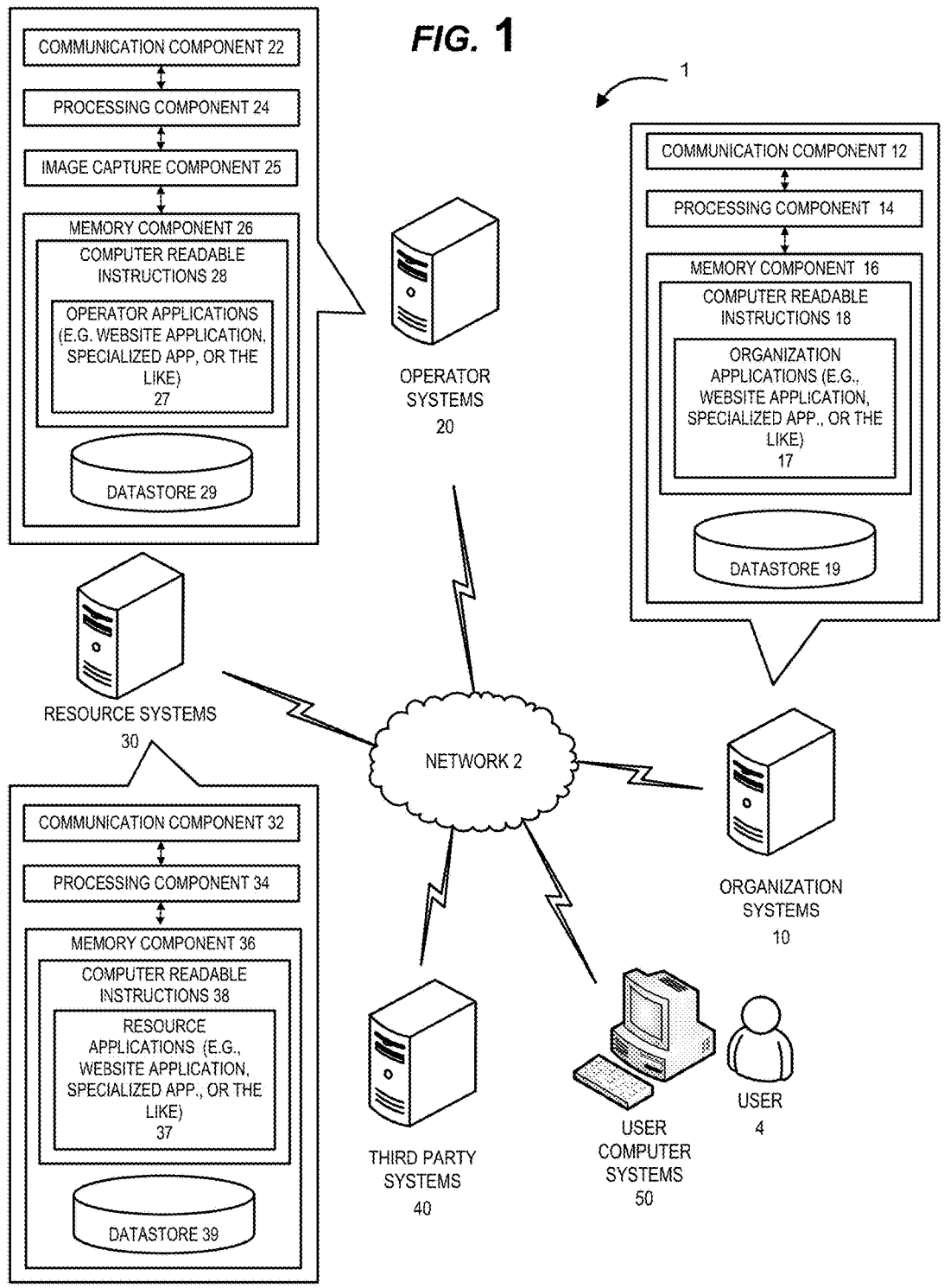

Having thus described embodiments of the invention in general terms, reference will now be made to the accompanying drawings, and wherein:

FIG. 1 illustrates a block diagram of a routing and distribution system environment, in accordance with embodiments of the invention.

Figure 2:
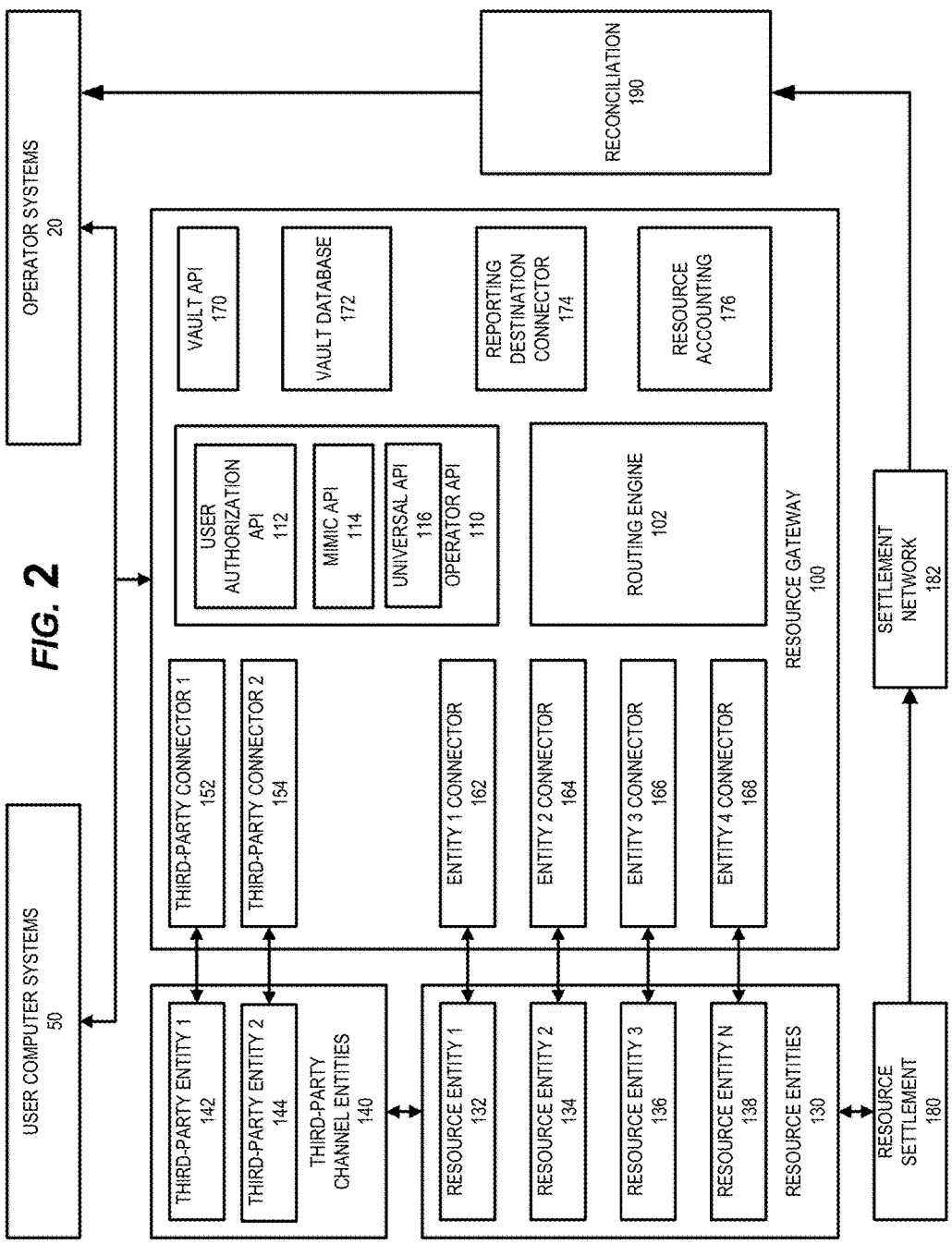

FIG. 2 illustrates a block diagram of a centralized routing and distribution system, in accordance with embodiments of the invention.

Figure 3:
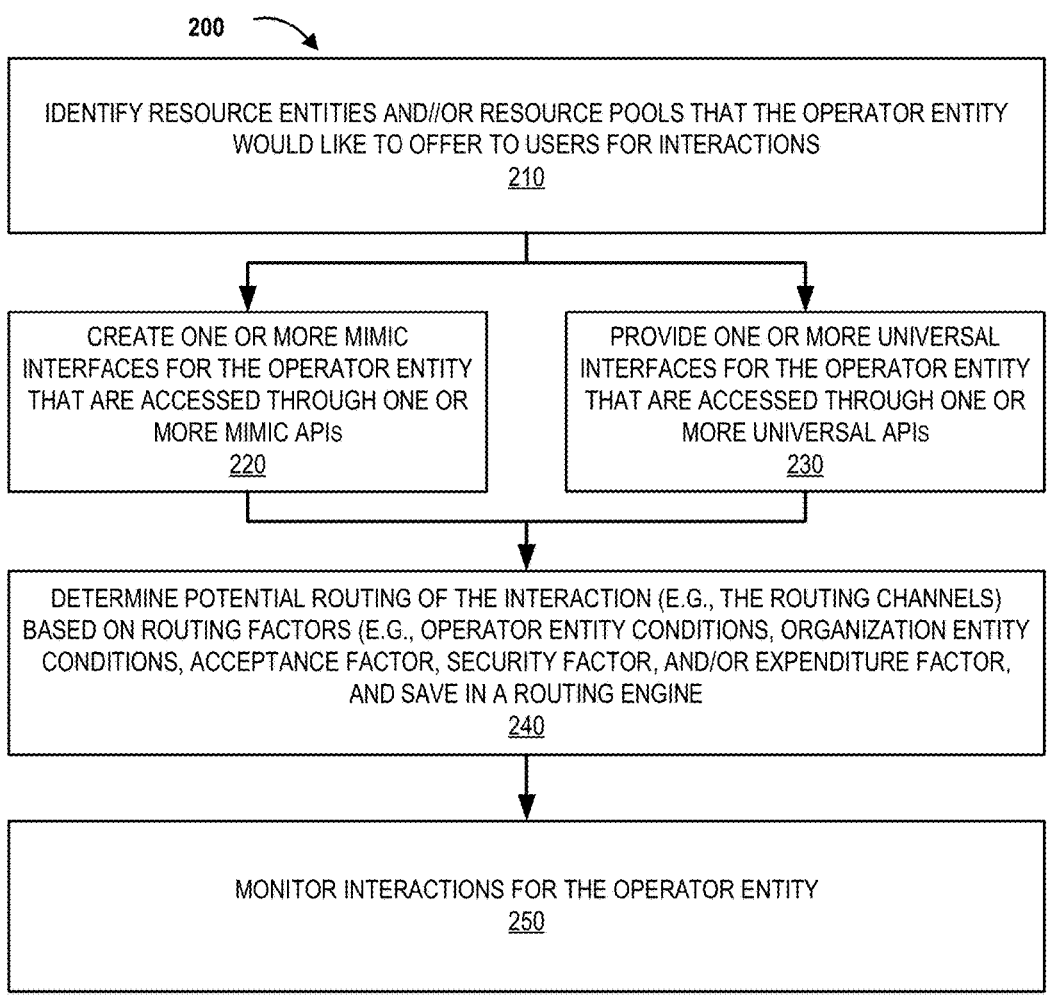

FIG. 3 illustrates a centralized resource routing integration process, in accordance with embodiments of the invention.

Figure 4:
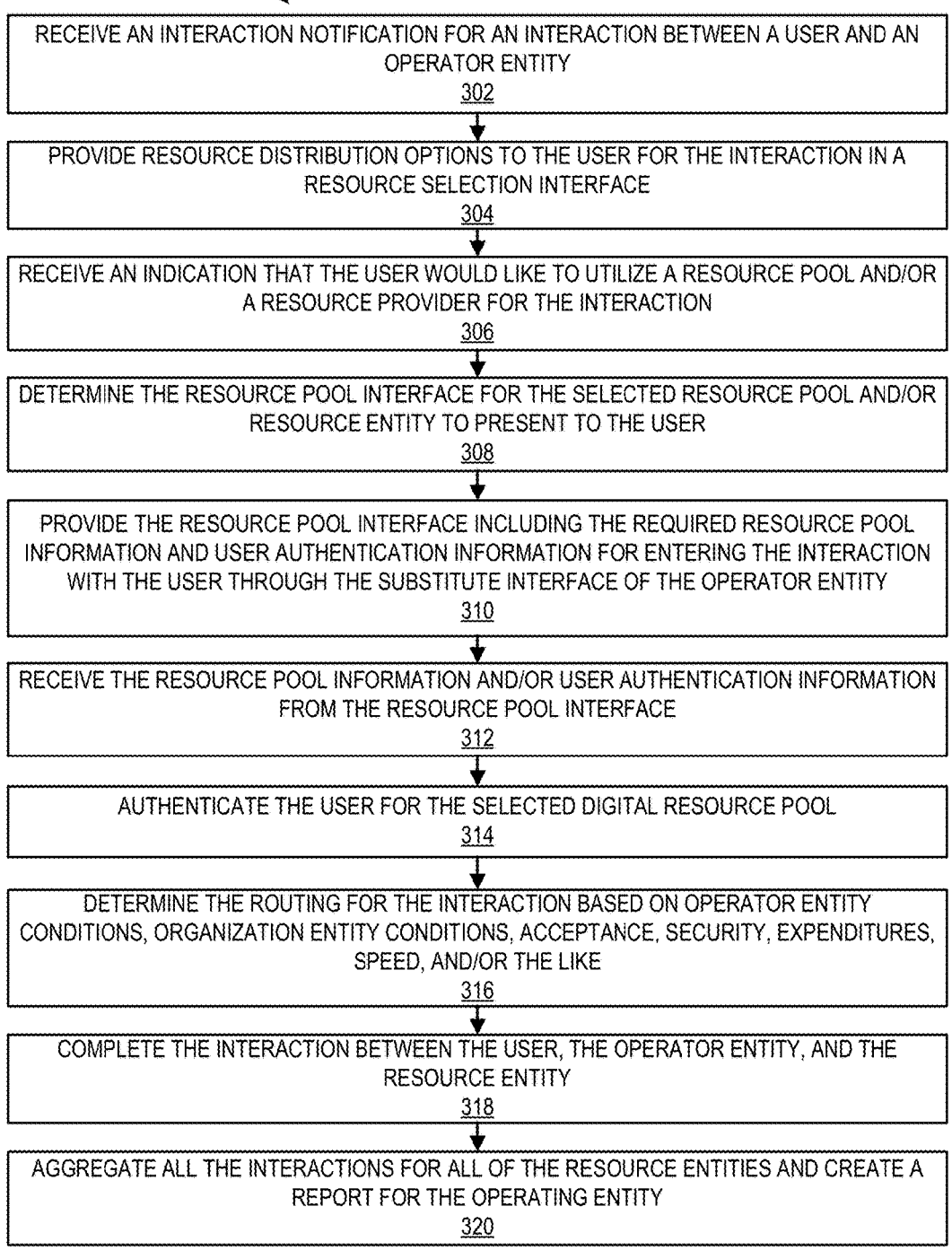

FIG. 4 illustrates a centralized resource routing and distribution process, in accordance with embodiments of the invention.

Figure 5:
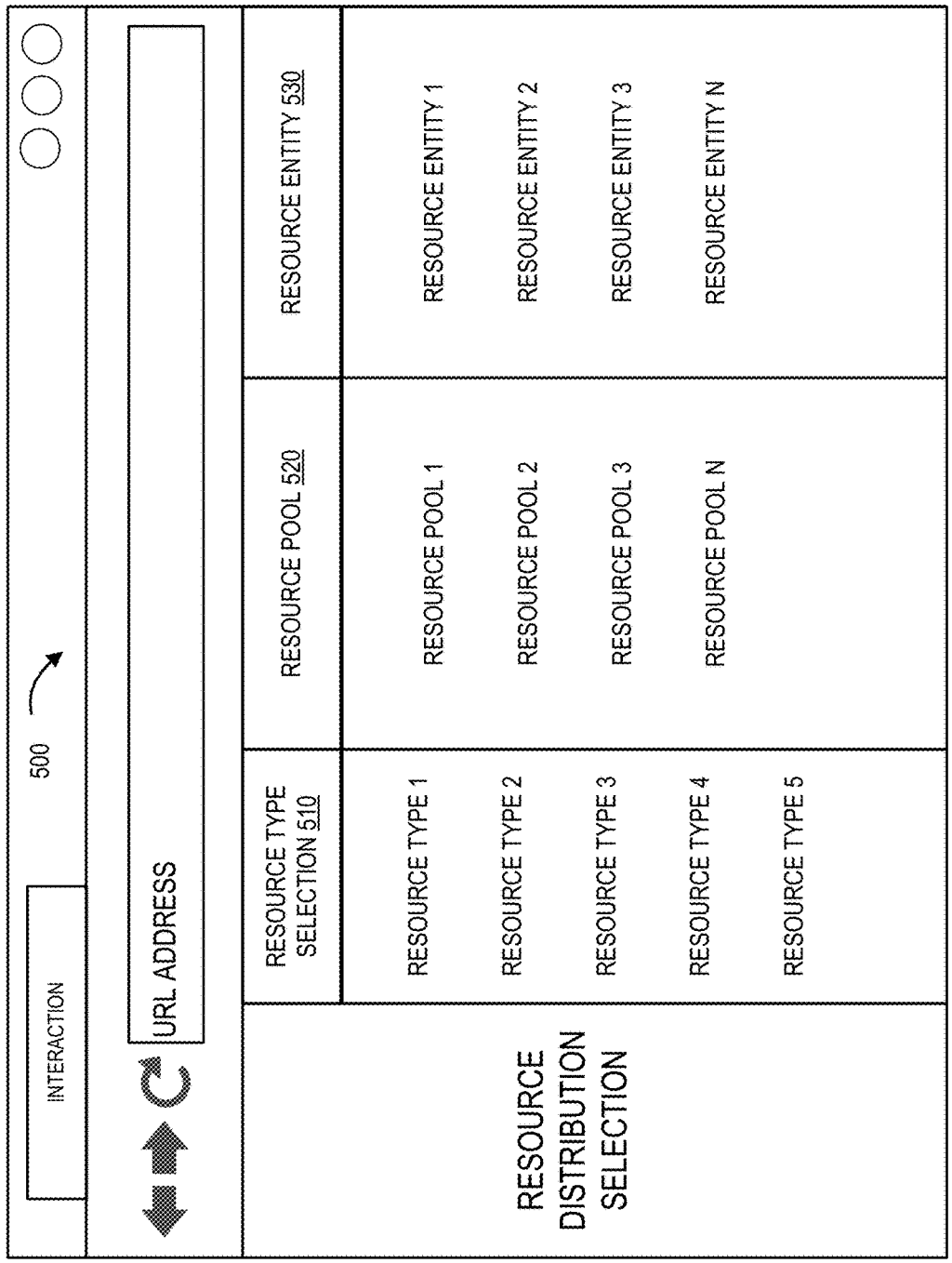

FIG. 5 illustrates a resource selection interface, in accordance with embodiments of the invention.

Figure 6:
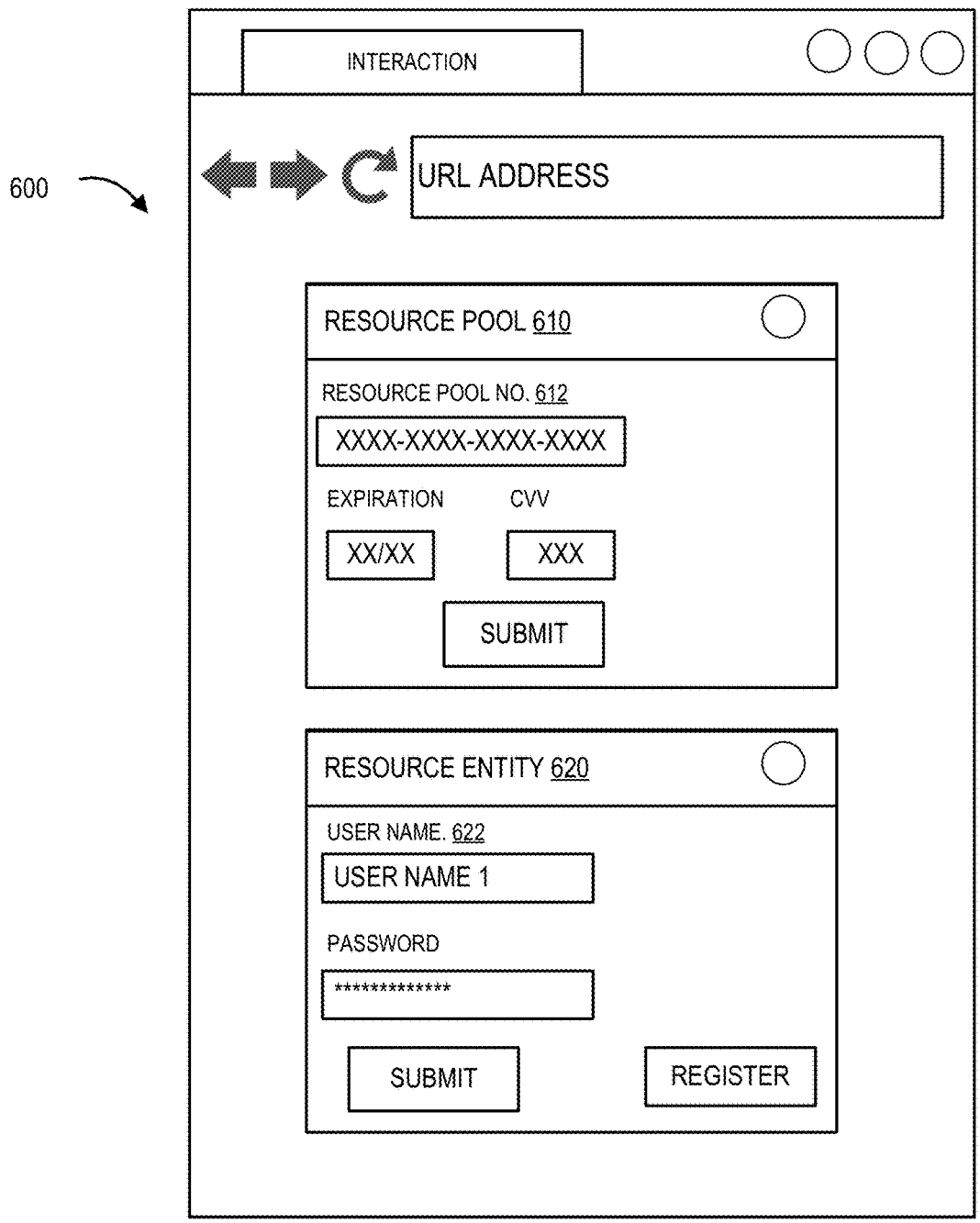

FIG. 6 illustrates a resource pool interface, in accordance with embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Generally, systems, computer products, and methods are described herein that provide for improving the routing of interactions and distribution of resources for the interactions between users and operator entities. The present invention provides a centralized gateway through which interactions may be routed and resources distributed using one or more substitute interfaces. The one or more substitute interfaces may mimic interfaces of the operator, or otherwise provide a universal interface for use of multiple resource pools for the interactions. The present invention allows an operator entity to utilize the centralized gateway and substitute interfaces provided by the organization to handle routing and processing interactions between the user and the operator entity, without the operator having to store routing and distribution information and/or without the operator having to manage user or interaction information. The present invention increases processing capacity, reduces memory requirements, and/or improves processing time for both the operator entities and the organization entities since the present invention provides for centralized routing and distribution for multiple operator entities without the operator entities having to store and/or process user information or the interactions associated therewith.

FIG. 1 illustrates a resource routing and distribution system 1, in accordance with embodiments of the invention. As illustrated in FIG. 1, one or more organization systems 10 are operatively coupled, via a network 2, to one or more operator systems 20, one or more resource systems 30, one or more third-party systems 40, one or more user computer systems 50, and/or one or more other systems (not illustrated). In this way, an operator entity may enter into interactions with the users 4 utilizing the organization entity (or another third-party entity) as the provider of centralized routing of the interactions and distribution of the resources without the operator entity having to store or process any user information related to the interactions. As such, in some embodiment of the invention the organization entity (or third-party entity) may provide one or more substitute interfaces in place of the operator's own interfaces in order route interactions and distribute resources utilized for interactions between the operator entity and users 4. As the various entities are described herein, the actual actions may be taken by the systems of those entities and/or representatives of the entities, such as one or more associates, employees, agents, contractors, sub-contractors, third-party representatives, customers, or the like. As described herein the users 4 may be an individual user or may be a representative acting on behalf of an entity.

The organization systems 10 may facilitate interactions between operator entities and a user 4 by communicating with the operator systems 20, the resource systems 30, the third-party systems 40, the user computer systems 50, and/or other systems through the network 2. The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the organization systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the one or more operator systems 20, the one or more resource systems 30, the one or more third-party systems 40, the one or more user computer systems 50, and/or other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the organization systems 10 comprise computer-readable instructions 18 stored in the memory component 16, which in one embodiment includes the computer-readable instructions 18 of the organization application 17 (e.g., website applications, dedicated applications, internal applications, or the like). In some embodiments, the one or more memory components 16 include one or more data stores 19 for storing data related to the organization systems 10, including, but not limited to, data created, accessed, and/or used by the organization application 17. The organization application 17 may be utilized to facilitate communications between the various systems in order to route and distribute resources, which increases processing capacity, reduces memory requirements, and reduces processing times for the operator entities and/or organization entities.

As illustrated in FIG. 1, one or more operator entities use one or more operator computer systems 20 to enter into interactions with one or more users 4 through one or more user computer systems 50 utilizing the one or more organization systems 10, such that the one or more operator systems 20 do not have to generally interact with the one or more resource systems 30 or one or more third party systems 40. The one or more operator computer systems 20 may generally comprise one or more communication components 22, one or more processing components 24, and one or more memory components 26. The one or more processing components 24 may include functionality to operate one or more software programs based on computer-readable instructions 28 thereof, which may be stored in the one or more memory components 26.

The one or more processing components 24 are operatively coupled to the one or more communication components 22, the one or more image capture components 25, and the one or more memory components 26. The one or more processing components 24 use the one or more communication components 22 to communicate with the network 2 and other components on the network 2, such as, but not limited to, the organization systems 10, the resource systems 30 (in some cases), the third-party systems 40, one or more user computer systems 50, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like.

As illustrated in FIG. 1, the one or more operator systems 20 may have computer-readable instructions 28 stored in the one or more memory components 26, which in one embodiment includes the computer-readable instructions 28 for one or more operator applications 27, such as dedicated applications (e.g., apps, applet, or the like), portions of dedicated applications, websites, or other apps that allow the operators to take various actions, including allowing the one or more operator entities to access applications located on other systems, or the like. In some embodiments, the one or more operator entities (e.g., merchants, business, or the like) utilize the one or more operator systems 20 to communicate with the one or more organization systems 10, in order to allow the one or more organization systems 10 to route interactions and distribute resources associated with the interactions with the users 4 without having to process and/or store user information for the interactions, and to leverage the routing channels to which the organization has access. It should be understood that the one or more operator systems 20 and/or one or more operator applications 28 may be utilized for interactions between the users 4 and the operator entity over the Internet (e.g., not in the same location) and/or in person (e.g., at brick and mortar locations, or the like). As such, in some embodiments the one or more operator systems 20 and/or operator applications 27 may include point of sale (e.g., POS) systems that provide an interface between the user 4 and the operator entity.

As illustrated in FIG. 1, one or more resource systems 30 may communicate with the one or more organization systems 10 and/or in some cases the one or more operator systems 20, one or more third-party systems 40, and/or one or more user computer systems 50 in order allow for routing of the interactions and distribution of the resources for interactions between the one or more operator entities and the one or more users 4. As such, the one or more resource systems 30 are operatively coupled, via a network 2, to the one or more organization systems 10, the one or more operator systems 20 (in some cases), the one or more third-party systems 40, the one or more user computer systems 50, and/or other systems (not illustrated). The one or more resource systems 30 generally comprise one or more communication components 32, one or more processing components 34, and one or more memory components 36. The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of the one or more organization systems 10, the one or more entity computer systems 20 (in some cases), the one or more third party systems 40, the one or more user computer systems 50 (in some cases), and/or other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more resource systems 30 may have computer-readable instructions 38 stored in the one or more memory components 36, which in one embodiment includes the computer-readable instructions 38 of resource applications 37 (e.g., resource pool or digital resource pool applications, apps, applets, websites, or other specialized or dedicated applications, such as for example digital wallets, or the like) that allow for the interactions between the one or more users 4 and the one or more operator entities, such as through the organization entities, and/or one or more third-party entities, as will be described herein. The one or more resource systems 30 may be utilized to facilitate the interaction between the one or more users 4, the one or more operator entities, the one or more organizations, and/or the one or more third-party entities through the one or more organization entities.

Moreover, as illustrated in FIG. 1, one or more third-party systems 40, one or more user computer systems 50, and/or one or more other like systems may be operatively coupled to the one or more organization systems 10, the one or more operator systems 20, and/or the one or more resource systems 30, through the network 2. These systems have components the same as or similar to the components described with respect to the one or more organization systems 10, the one or more operator systems 20, and/or the one or more resource systems 30 (e.g., one or more communication components, one or more processing components, and one or more memory devices with computer-readable instructions of one or more applications, one or more datastores, or the like). Thus, the one or more third-party systems 40, the one or more user computer systems 50, and/or the other like systems communicate with the one or more organization systems 10, the one or more entity computer systems 20, the one or more resource system systems 30, and/or each other in same or similar way as previously described with respect to the one or more organization systems 10, the one or more entity computer systems 20, and/or the one or resource systems 30.

It should be understood that the one or more third-party entities may be intermediaries that currently act as intermediaries between the resource entities, organization entities, and/or operator entities. The one or more third party systems 40 may be the systems that the one or more third party entities use to communicate with the other systems.

It should be understood that the one or more user computer systems 50 may be a desktop, mobile device (e.g., laptop, smartphone device, PDA, tablet, or other mobile device), or any other type of computer that generally comprises one or more communication components, one or more processing components, and one or more memory components. It should be understood that the one or more communication components generally comprise a wireless transceiver, modem, server, electrical connection, or other component for communicating with other components on the network 2. The one or more communication components may further include an interface that accepts one or more network interface cards, ports for connection of network components, Universal Serial Bus (USB) connectors and the like. Moreover, the one or more communication components may include a keypad, keyboard, touch-screen, touchpad, microphone, mouse, joystick, other pointer component, button, soft key, and/or other input/output component(s) for communicating with the other systems.

FIG. 2 illustrates a block diagram of a centralized routing and distribution system, in accordance with embodiments of the invention. FIG. 2 will be described in further detail throughout, such as with respect to the processes illustrated in FIGS. 3 and 4, however, in general FIG. 2 illustrates the centralized gateway located within the one or more organization system 10 that is utilized to provide one or more substitute interfaces for the operator interfaces in order to centralize the routing of interactions and distribution of resources for the interactions, as well as completion of the interactions, in order to reduce the processing capacity, memory requirements, and processing time of the routing and distribution that is typically required by each of the operators. It should be further understood that the security of the user information and interaction information is improved because the operators do not have to "touch" (e.g., store this information) for purposes of completing the interaction.

FIG. 3, illustrates a process for a centralized resource integration process 200, in accordance with embodiments of the invention. As illustrated by block 210 of FIG. 3, the one or more operator entities (e.g., one or more merchants, or other businesses) and the one or more organizations (e.g., one or more financial institutions, or one or more parties acting on behalf of the financial institution) may communicate in order to identify the one or more resource entities (e.g., one or more resource providers such as other financial institutions, sources of resources, digital wallet providers, other resource providers, or the like) and/or resource pools (e.g., one or more accounts, digital wallets, or the like) that the operator entity would like to offer to one or more users 4 in order to enter into one or more interactions with the one or more users 4. In some embodiments, the organization may already have relationships with the resource entities or the organization may have to communicate with the resource entities in order to set up relationships. For example, as illustrated in FIG. 2 the operator may want to present one or more resource entities (e.g., resource entity 1 132, resource entity 2 134, and resource entity 3 136) to the one or more users 4 as options for entering into interactions with the operator (e.g., transfer resources to the operator). It should be understood that the organization may have communications with a plurality of resource entities 130, that is, resource entity 1 132, resource entity 2 134, resource entity 3 136, and/or resource entity N 138. The organization (e.g., the financial institution) may have many more connections than one single operator may be able to have. Since the organization communicates with multiple resource entities on a daily basis, it is in a better position to route interactions and distribute resources on behalf of a single operator. It should be further understood that traditionally, should each individual operator entity wish to provide one or more resource entities 130, as options for one or more users 4 transferring resources, each individual operator must kept track of the required resource pool information and processing that each resource entity uses for interactions, which may all be different from one another. It should be further understood that each operator that identifies and stores this required resource pool information and processing, duplicates this information, which increases the necessary processing capacity, memory required, and processing speeds of the operator systems because each individual resource entity is storing redundant information. Alternatively, if the organization stores this information, the organization need only store the required resource pool information and processing for each resource entity, and the organization can used the single stored required resource pool information for each of the plurality of operators that use the services of the organization. While it is discussed herein that the organization entity is the entity that is utilized to provide the centralized routing and distribution, it should be understood that this may be a financial institution or another entity acting on behalf of one or more financial institutions to operate and/or manage the centralized routing and distribution system. As such, a plurality of organizations (e.g. a plurality of financial institutions) may access the centralized routing and distribution system in order to process interactions for a plurality of operators.

Blocks 220 and 230 of FIG. 3 illustrate that one or more substitute interfaces for the one or more operator entities may be created in order to present interfaces controlled by the organization through the operators' own systems. As illustrated in FIG. 2, the one or more substitute interfaces may be accessed through one or more operator APIs 110 that can be utilized by the operator entities to present the one or more substitute interfaces to the users 4 for the interactions.

Block 220 of FIG. 3 illustrates that the one or more mimic interfaces are created for operator entities that currently have interfaces that they present to one or more users 4 in order to mimic the one or more interfaces previously presented by the operator entities. It should be understood that the mimic interfaces may be utilized to provide seamless integration of the interfaces that were previously presented to the one or more users 4 in the past to the one or more users 4 in the future. That is, one or more users 4 utilizing the interfaces of the operator entity may not know that the one or more mimic interfaces are now being presented by the one or more operators in place of the interfaces previously presented by the one or more operators. The one or more mimic interfaces may be implemented through the operator systems 20 through the use of one or more mimic APIs 114 that can be accessed by the operator systems 20 in order to present the one or more mimic interfaces to the users 4 through the operator systems 20. There may be one or more mimic interfaces for each operator entity depending on the number of interfaces that each operator entity presented to the users 4 in the past for the multiple resource pools available to the users 4 in the past.

Alternatively, block 230 illustrates that one or more universal interfaces are created and/or utilized (e.g., if previously created) to present to users 4 in the case when the operators do not currently have one or more substitute interfaces to present to the one or more users 4 when entering into interactions. The one or more universal interfaces may provide generic interfaces through which the operator entities may allow for processing of any type of interaction. For example, the one or more universal interfaces may have the same generic look and feel as the other interfaces offered by the operator entity, but may allow for any type of interaction based on information stored by the organization for each resource entity. The one or more universal interfaces may be implemented through the operator systems 20 through the use of one or more universal APIs 116 provided by the organization systems 10, as illustrated in FIG. 2.

In some embodiments of the invention, as illustrated in FIG. 2, in addition to the one or more mimic APIs 114 and the one or more universal APIs 116, the one or more operator APIs 110 may include one or more user authorization APIs 112. The one or more user authorization APIs 112 may be separate APIs or may be a part of another API, such as the one or more mimic APIs 114 and/or the one or more universal APIs 116. It should be understood that the one or more user authorization APIs 112 are utilized by the operator systems 10 (e.g., presented to the user computer systems 50) to authentic the user 4 when the operator and user 4 enters into an interaction. It should be understood that by the organization providing a user authorization API 112 (separate or as part of one or more of the substitute interfaces), the operator systems do not have to hold any user information, which improves security for all parties. Since the organization is holding the user information, which is a business that has experience holding user information (e.g., a financial institution, or the like), the plurality of operators (e.g., merchants, or other businesses) do not have to hold user information, which reduces of the number parties that have to "touch" the user information.

As described briefly herein, the one or more APIs allow for a centralized location for the one or more operators in order to carry out the interactions described herein. That is, the present invention provides a single location that the operator entities may use to present interfaces to users 4 for providing various types of resources and routing options for the interactions. This central location allows the operators to transfer the costs and security associated with capturing, storing, and routing user information and/or associated resources for interactions to an organization that provides more routing options and has improved security with respect to processing the user information and interaction information. In this way, the operator does not have to access and communicate with the various resource systems and/or the third-parties each time the operator enters into an interaction with a user 4 and/or transfers resources to the recipient entity. Since the organizations and/or third parties are more regularly handling the resource routing and distribution from a centralized location, this improves processing times, reduces memory requirements, and increases the processing capacity of the operators, the organizations, the resource entities, and/or third-parties involved in the interactions. That is, for example, the parties involved do not each have to store redundant information for the users and/or interactions, and/or do not have to take redundant actions. For example, an operator does not have to capture and store resource pool information and user information to transfer such information to the organization and the resource entity in order to transfer resources from the resource entity to the resource pool of the operator located at the organization.

Returning to FIG. 3, regardless of the type of substitute interface presented, as illustrated by block 240, a determination of potential routings for the interaction and distribution of the resources is made. That is, it is determined how interactions using different resource pools will be routed based on a number of different routing factors. It should be understood that there are numbers of different ways that resource may be routed, and in some cases routed to the same resource entity. In some embodiments, as illustrated by FIG. 2 the routing may occur directly from the organization to the one or more resource entities 130 through one or more dedicated entity connectors (e.g., entity connector 1 162, entity connector 2 162, entity connector 3 166, entity connector N 168). Alternatively, the routing may occur through one or more third-party entities 140, such as through one or more third-party gateways and/or one or more third party processors, provided by the one or more third-party entities 140. The third party gateways and/or processors may be accessed through the use of one or more third-party connectors (e.g., third party connector 1 152, third-party connector 2 154, third-party connector N). These one or more third-party entities 140 may then communicate with the one or more resource entities 130 in order to route the interactions and distribute the resources. There may be tens or hundreds of different ways to route interactions and distribute resources between the one or more users 4 and the one or more operator entities. It would be difficult for a single operator, who is concentrated on providing products (e.g., goods and/or services) to one or more users 4, to be able to manage all the different routing possibilities, much less determine the best routings for the operator, as will be described in further detail herein.

It should be understood that the routing factors may determine how the resources for the interaction may be routing and/or distributed. Routing factors may include one or more operator conditions. The operator conditions may include preferences of the routing based on previously negotiated contracts with one or more resource entities 130 and/or one or more of the third-party entities 140. That is, the operator entities may have contracts with the one or more third-party entities 140 and/or the one or more resource entities 130 in order to receive discounts for routing each interaction in a particular way. The routing factors may further include one or more organization conditions. Like the operator conditions, the organization conditions may be based on negotiated contracts with the one or more resource entities 130 and/or the one or more third party entities 140.

Other routing factors may include an acceptance factor, an expenditure factor, a security factor, and/or a speed factor. The acceptance factor may include the rate at which a particular routing results in acceptance of the interaction. It should be understood that some routings are more reliable than others (e.g., computer systems are more reliable) and more accurate (e.g., less errors occur), and/or are more apt to result in acceptance of the interaction. With respect to the expenditure factor of the routing, this may include both the expenses associated with the routing based on what the one or more resource entities 130 and/or third-party entities 140 may charge for routing the interactions, as well as the expenses of the organization in order to route the resources (e.g., computing power, software used to route the resources, or the like). With respect to the security factor, this may include which routings have more secure channels for routings. That is, some resource entities 130 and/or third-party entities 140 may have more secure communication systems, software, interfaces, and protocols associated with routing the interactions and distributing the resources. Finally, with respect to the speed factor, different routing channels may result in more timely approvals and/or distribution of resources, and as such, the interactions may be routed and the resources may be distributed based on the time it takes to route the interactions and/or resources. It should be further understood that in some embodiments an interaction may be routed for approval using one routing channel, while the distribution of the resources for the interaction are routed through a different channel (e.g., routed to or from the same resource entity using different channels). In this way, the approval routing may be routed based on one or more routing factors (e.g., for speed, or the like), while the resources may be routed based on one or more routing factors (e.g., expenditures, or the like).

It should be understood that the routing factors may be stored within a routing engine 102 as illustrated in FIG. 2. The routing engine 102 may include the routing factors (e.g., rules, or the like) for each operator, resource entity, third party entity, and/or organization, such that when routing the interactions and distributing the resources, the routing engine determines the routings for each of the interactions based on the routing factors stored by the routing engine 102 or otherwise provided by the operator when entering the interactions (e.g., specifically requested by the operator for each interaction). In this way, the organization is able to optimize the routing of the interactions based on what each entity views as the most important routing factor.

Returning to FIG. 3, block 250 illustrates that the interactions for the operator entity are monitored by the organization. That is, once the operator is "on boarded" for utilizing the organization for routing and distribution of resources associated with interactions, the organization will handle any interaction for the operator that involves routing and distributing resources to the one or more resource entities 130 and/or through the one or more third-parties entities 140, as will be described in further detail in FIG. 4.

FIG. 4 illustrates a centralized resource routing and distribution process, in accordance with embodiments of the invention. As illustrated by block 302 in FIG. 4, the organization systems 10 may receive an interaction request notification for an interaction between a user 4 and an operator entity. The interaction request notification may be received from the operator systems 20, when the operator enters into interactions with a user 4 through the user computer systems 50. It should be understood that the interaction may occur between the user 4 and the operator over the network 2. Alternatively, the user 4 may enter into an interaction with the operator entity directly with one or more operator systems 20 (e.g., point of sale at a brick and mortar location), using a physical card or electronically through the use of a device (e.g., a fob or the like) or system (e.g., a user computer system 50, such as a mobile device).

Regardless of the location of the interaction (e.g., over the Internet or through a point of sale location) the interactions may proceed in the same or similar way. It should be understood that an interaction may be the user requesting to purchase a product, return a product, receive a rebate or refund, or the like with the operator entity (e.g., merchant or the like). For example, after agreeing to enter into an interaction, the user 4 may indicate to the operator systems 20, that the user would like to checkout (e.g., pay to complete the interaction). The indication may be in the form of an electronic request over a network 2, such as through the Internet 2 when the user 4 is in a different location than the operator entity, in the form of an in-person electronic request (e.g., near field communication, or other like in-person electronic communication) when the user 4 is located at the operator systems 20 (e.g., at the point of sale), or in the form of a physical indication (e.g., selecting checkout feature at a point of sale device, making a selection to pay by a physical card or other physical device, or other like indication). Regardless of how the user 4 indicates the selection of the payment, in response, the operator systems 20 may communicate with the organization systems 10 that an interaction is occurring between the user 4 and the operator entity.

Block 304 of FIG. 4 illustrates that resource distribution options are provided to the user 4 for the interaction in one or more interfaces. It should be understood that the resource distribution options may be provided by the operator entity through the operator systems 20, or by the organization through the organization systems 10. In some embodiments of the invention, the organization systems 10 provide a resource selection interface through which a user 4 may select how to transfer resources for the interaction. FIG. 5 illustrates one embodiment of the resource routing distribution interface 500. FIG. 5 illustrates that the resource selection interface 500 may include a currency selection section 510, a resource pool selection section 520, a resource entity selection section 530. As such, the resource selection interface may allow for a selection of a type of resource (e.g., currency), a selection of one or more resource pools (e.g., credit cards, debit card, equity lines, digital currency, or other source of funds), a selection of one or more resource entities (e.g., digital wallets holder, account holder, or the like). As previously discussed, the resource selection interface 500 may be provided by the organization instead of the operator. In this way, the operator systems 20 may access the organization systems 10 in order access one or more operator APIs 110 in order to provide one or more substitute interfaces to present to the user 4 on the user computer systems 50 as the operator's own internal interfaces. As previously discussed, the one or more substitute interfaces may be one or more mimic interfaces and/or one or more universal interfaces depending on the operator's preference. As such, the user 4 may not be aware that they are being presented an interface from the organization instead of the operator.

Block 306 illustrates that a selection indication is received that the user 4 would like to utilize a resource pool and/or utilize a specific resource entity (e.g., a particular digital wallet including the resource pool) for the interaction. For example, the user 4 may select resource pool 1, resource pool 2, or the like, and/or resource entity 1, resource entity 2, or the like from the resource selection interface 500. Alternatively, when located at the operatory systems 20 (e.g., at a point of sale) the user 4 may select a resource pool and/or resource entity on the operator systems 20 directly from a display on the operator systems 20, or on the user computer systems (e.g., in a mobile device app) that can be transferred to the operator systems 20 (e.g., wave a phone over the point of sale, allow the point of sale to scan the display or other feature of the user computer system 50, or the like). It should be understood that multiple resource entities may allow for the use of the same resource pools. For example, a first digital wallet for one resource entity may allow for use of resource pool 1 and resource pool 2, while a second digital wallet may allow for use of resource pool 2 and resource pool 3. As such, the user 4 may select any one of the resource pools from any one of the resource entities that allow for the user of the resource pool to enter into an interaction.

As illustrated by block 308 in FIG. 4, the organization systems 10 determine a resource pool interface for the selected resource pools and/or the selected resource entity (e.g., the digital wallet entity) to present to the user 4 for the interaction. The resource pool interface will include resource information (e.g., optional resource information, required resource information, or the like) for routing the interaction for processing. In this way, the organization systems 10 may access the resource systems 30 and/or third-party systems 40 in order to capture what resource information is required to process an interaction and include this resource information in the one or more substitute interfaces. Alternatively, and/or additionally, the organization systems 10 may access one or more pre-stored substitute interfaces that includes the resource information needed. The organization systems 10 may store the resource pool interfaces for each of the operators, as well as the resource pool information required by each resource entity to process interactions, in a database. Alternatively, and/or additionally, the organization systems 10 may access the resource pool interfaces that are stored by each of the resource entities (e.g., digital wallet providers) to identify the one or more substitute interfaces (e.g., connect to the resource systems 20 and pull-up resource pool interfaces, or portions thereof) for eventual presentation to the users 4. Regardless of how the resource information is accessed, the resource information needed for the resource pool selected in block 306, is either integrated into the resource pool interface and/or pulled from another entity, such as the resource entity, and will ultimately be displayed to the user 4 in lieu of the operator interface.

FIG. 4 further illustrates in block 310, that the resource pool interface determined (e.g., created, accessed, or the like) by the organization systems in block 308 is provided (e.g., presented, or the like) to the user 4 in the user computer systems 50 through the operator systems 20 or directly by the organization systems 10. FIG. 6 illustrates one example embodiment of a resource pool interface 600 in accordance with embodiments of the invention. The resource pool interface 600 may include the resource pool selected by the user 4 in a selected resourced pool section 610 and the associated selected resource entity (e.g., selected digital wallet) in a selected resource entity section 620. The resource pool information 612 required may be included in the resource pool section 610. The user authentication information 622 required to authenticate the user 4 for the selected resource entity may be included in the resource entity section 620. Alternatively, with respect to an interaction that occurs directly at the location of one or more of the operatory systems 20, the interface may be presented to the user 4 on a display of the operator systems 20, may be presented on a display of the user computer systems 50 that can then be transferred to the operator systems 20 (e.g., though communication between the user computer systems 50 and the operator systems 20), or may be automatically entered into the operator systems 20 by the user 4 taking a physical action (e.g., sliding a card, waving a fob, watch, or mobile device, typing information into the display, or taking another like action).

Block 312 of FIG. 4 illustrates that the organization systems 10 receives the resource pool information and/or the user authentication information from the user 4 through the resource pool interface, such as over the Internet or directly on the operator systems 20 in a physical interaction. For example, in one embodiment the user 4 enters the resource pool information and/or the user authentication information into the resource pool interface 600. Alternatively, the organization systems 10 pre-populate the resource pool information and/or the user authentication from information stored by the organization in a database. In other embodiments, the physical act (e.g., swiping a card, pass a mobile device, or the like) taken by the user 4 may automatically transfer the resource pool information (e.g., account numbers, security code, or the like) and/or the user authentication (e.g., user name, password, electronic signature, user identifier, phone number, electronic address, or the like) to the operatory systems 20 or interface associated therewith.

FIG. 4 further illustrates in block 314 that the user authentication information and/or the resource pool information is used to authentic the user for the selected resource pool and/or resource entity. In some embodiments the organization may access stored information in order to authenticate the user 4. For example, as illustrated by the vault API 170 and the vault database 172 in FIG. 2, the present invention may store user authentication information (e.g., login information, or the like) and/or resource pool information (e.g., account numbers, or the like) for the users 4 and/or resource pools of the users 4. This stored information may be utilized to authenticate the user 4 without having to access the resource systems 30. In other embodiments, the organization may authenticate the user 4 using the routing and distribution factors stored by the routing engine 120. That is, the organization may communicate with the one or more resource entities 130 and/or one or more third party entities 140 to authenticate the user 4 for the selected resource pool and/or the selected resource entity. It should be understood that by storing and/or accessing the user authentication information and/or the resource pool information, the organization, not the operator, is the entity that "touches" the information about the user 4. As such, privacy and information security issues are centralized with the organization, and the various operators do not need to "touch" any user and/or resource pool information (e.g., login, password, account numbers, security codes, security questions, or the like).

Block 316 of FIG. 4 illustrates that the organization systems 10 determine the routing for the interaction based on the routing factors previously discussed herein. It should be understood that the routing engine 120 will route the interaction to the proper resource entity 130, potentially through the one or more third party entities 140, in compliance with the routing factors, such as the operator conditions, the organization conditions, the acceptance factor, the security factor, the expenditure factor, the speed factor, and/or other factors associated with routing the interaction. As such, depending on the type of interaction, the amount associated with the interaction, the frequency of the interactions, the identity of the user, the identity of the operator entity, or the like (collectively the "interaction information"), the organization systems 10 will route the interaction in accordance with and/or to optimize one or more of the routing factors for one or more of the entities involved in the interaction.

FIG. 4 further illustrates in block 318 that the interaction is completed between the user 4, the operator, the resource entity, the third party entity (if included), and the organization. It should be understood that completion of the interaction may include transferring the resources available to the user at the resource entity to the operator (e.g., potentially through the third party entity and/or the organization) or vice versa (e.g., for a return). As illustrated in FIG. 2, the resource settlement may occur outside of the organization as illustrated by the resource settlement 180 block, through a settlement network 182 and reconciliation 190 in communication with operator systems 20. However, in other embodiments the settlement and reconciliation may occur through the organization systems 10. In some embodiments of the invention the organization may transfer resources as a placeholder until the resources are received from the resource entity. Moreover, the interaction information is stored by the organization for account purposes and/or in case there are cancelations, returns, refunds, or the like for the user 4. For example, the organization systems 10 may include a resource accounting database 176 that stores an accounting of all of the interactions, such that if the product is returned or damaged, and a refund or credit is in order, the organization systems 10 can handle any follow up interactions related to the original interaction.

Block 320 of FIG. 4 illustrates that all of the integration information is aggregated in the way in which the operator entity my request the information into a report. For example, the operator may want all interactions for a particular resource entity grouped into a report. As such, the organization systems 10 may aggregate the interaction information for each interaction and provide a report to the operator, on demand, or as a periodic report (e.g., daily, weekly, monthly, or the like). Additionally, the organization may also provide reporting to the resource entities (e.g., digital wallet providers, traditional account providers, or the like), the users 4, and the operator entities that utilize the resource entities, as well as routing information to the resource entities and third-party entities to improve routings of the interaction (e.g., improve one or more of the routing factors). As illustrated in FIG. 2, the organization systems 10 may include a reporting destination connector 174 that is utilized to determine the reports that each operator entity, resource entity, and/or third-party entity desires.

The present invention provides a number of technical improvements over the current routing of interactions. For one, the present invention provides one or more substitute payment interfaces that are accessed by a plurality of merchants through a single merchant API (e.g., through which multiple interfaces may be accessed), which each merchant may utilize to present a single payment interface to customers regardless of the form of the payment that the customer would like to use. Once the customer selects the payment type (e.g., digital wallet provider and/or specific account) the financial institution determines the required information needed to use the payment type for the interaction and displays inputs for the payment type and user authentication in the substitute interface that the merchant presents to the user 4. As such, the present invention provides a simulated merchant site, such that the merchant does not have to handle any processing of the transactions, but still controls the payment interface presented to the customer (e.g., look and feel of the interface).

Moreover, since the financial institution already has relationships with various routing channels, the present invention shifts the responsibility of routing transactions to the financial institution, which has more routing options. In this way, the merchants do not have to store routing process requirements for all of the different payment options that customers may like to use. The financial institution is in a better position to store this information and handle the routing because the financial institution has more available routing options. As such, the complexity of each merchant having multiple connections to processors, gateways, and digital wallets, with multiple APIs is handled by the financial institution through a single connection, gateway, and API between the merchant and financial institution.

Moreover, because of the ability of the finical institution to aggregate transactions, the financial institution is able to provide a single settlement file to each of the merchants across multiple payment entities (e.g., other financial institutions, digital wallet providers, or the like). The single settlement file simplifies the back office accounting entries of the merchants regardless of how each of the customers pay for the transactions.

Furthermore, the centralized location of routing the transactions provides a single location to trace transactions for the merchant such that the merchants only need to access a single location to determine the status of transactions (e.g., stamped, pressed, circulated, posted, settled, or the like as some examples) instead of having to access each payment entity (e.g., digital wallet provider, traditional financial institution) separately. As such, the full lifecycle of payment requests and settlements can be accessed and controlled in a single location. Additionally, each merchant may change the routing of its transactions to optimize the underlining features of the routing factors for different transactions. For example, the merchants may send some transactions to improve the acceptance rate, and send other transactions to reduce expenses. Without the present invention merchants do not have access to all the routing channels that the financial institution has, and thus, cannot manage the various routings of the transactions.

Additionally, the financial institution has a more secure systems than most merchants. The financial institution is able to store the user information and account information in a centralized location instead in redundant locations at each merchant. The less information the merchant has to "touch" reduces the risk of a breach of user or account information occurring through the merchant systems.

These improvements of the present invention over traditional routing of transactions provides improved processing capacity, reduced memory requirements, and improved processing times because each merchant is not required to have redundant APIs with the payment entities, redundant storage of user and account information, and additional cyber security systems and processes.

In some embodiments of the invention, one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems, devices, or components thereof described herein.

It should be understood, that the systems, devices, and components described in FIGS. 1 and 2, or other devices not specifically described herein, may be configured to establish an electronic communications link with each other in order to accomplish the steps of the processes described herein. The link may be an internal link within the same systems or an external link with the other systems of other parties. The information provided by the systems may be made continuously available, however, continuously available does not necessarily mean that the sources actually continuously generate data, but that a sources are continuously available to generate and send data in real-time (e.g., instantaneously and/or within a few seconds, or the like) of receiving a request. In any case, the sources may be continuously available to receive and/or generate information, in some cases in digitized data in Internet Protocol (IP) packet format.

Moreover, it should be understood that the process flows described herein include transforming the information sent and/or received from the applications of the different systems (e.g., internally or externally) from one or more data formats into a data format associated with each individual system. There are many ways in which information is converted within the system environment 1. This may be seamless, as in the case of upgrading to a newer version of a computer program. Alternatively, the conversion may require processing by the use of a special conversion program, or it may involve a complex process of going through intermediary stages, or involving completing "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In accordance with embodiments of the invention, the term organization may relate to a "financial institution" and/or "financial entity", which includes any organization that processes financial resource transfers including, but not limited to, banks, credit unions, savings and loan associations, investment companies, stock brokerages, asses management firms, insurance companies and the like. In specific embodiments of the invention, use of the term "bank" may be limited to a financial entity in which account-bearing customers conduct financial resource transfers, such as account deposits, withdrawals, transfers and the like. Moreover, the term organization entity may be a third party acting on behalf of the financial institution and/or financial entity.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It should be understood that "operatively coupled," when used herein, means that the components may be formed integrally with each other, or may be formed separately and coupled together. Furthermore, "operatively coupled" means that the components may be coupled directly to each other, or to each other with one or more components located between the components that are operatively coupled together. Furthermore, "operatively coupled" may mean that the components are detachable from each other, or that they are permanently coupled together.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for centralized resource routing and distribution, the system comprising:
   one or more memory components having computer readable code stored thereon; and
   one or more processing components operatively coupled to the one or more memory components, wherein the one or more processing components are configured to execute the computer readable code to:
     receive an interaction notification for an interaction between a user and an operator entity, wherein the interaction notification is received through one or more operator entity systems;
     receive a selection indication that the user would like to utilize a resource pool of a resource entity for the interaction;
     determine a resource pool interface, including at least required resource pool information for entering into the interaction using the resource pool, wherein the resource pool information is determined from a resource pool database or from communicating with one or more resource entity systems;
     display the resource pool interface with the required resource pool information for the resource pool, wherein the resource pool interface is provided to the operator entity in place of one or more operator interfaces, and wherein the resource pool interface is provided through the one or more operator entity systems for display to the user on a user computer system or on the one or more operator entity systems;

receive the required resource pool information for the resource pool;

authenticate the user for the resource pool, wherein the authentication occurs by accessing a user authentication database or by communicating with the one or more resource entity systems;

determine routing of the interaction for the resource pool based on a routing factor; and completing the interaction between the user, the operator entity, and the resource entity.

2. The system of claim 1, wherein the one or more processing components are configured to execute the computer readable code to provide a resource selection interface to the user, wherein the resource selection interface is provided for the operator entity in place of the one or more operator interfaces, and wherein the resource pool interface is provided through the one or more operator entity systems for display to the user on the user computer system or on the one or more operator entity systems; and provide resources distribution options for one or more resource pools or one or more resource entities in the resource selection interface to the user for the interaction.

3. The system of claim 2, wherein the one or more resource entities are one or more digital resource entities; and wherein receiving the selection indication that the user would like to utilize the resource pool for the interaction comprises receiving a selection of one of the one or more resource pools available through the one or more digital resource entities.

4. The system of claim 1, wherein the interaction is one of a plurality of interactions that the operator entity has entered into with a plurality of users that utilize a plurality of resource entities, and wherein the one or more processing components are further configured to:

aggregate the plurality of interactions and a plurality of interaction information for the plurality of interactions with the plurality of resource entities into a report; and send the report to the operator entity, wherein the report is provided through the one or more operator entity systems.

5. The system of claim 1, wherein the one or more processing components are further configured to:

identify one or more resource pools or one or more resource entities that the operator entity would like to offer to a plurality of users; and create one or more substitute interfaces for the operator entity to present to the plurality of users in place of the one or more operator interfaces, wherein the one or more substitute interfaces at least comprise the resource pool interface.

6. The system of claim 5, wherein the one or more substitute interfaces comprise one or more mimic interfaces, wherein the one or more mimic interfaces mimic the one or more operator interfaces provided by the operator entity.

7. The system of claim 5, wherein the one or more substitute interfaces comprise one or more universal interfaces, wherein the one or more universal interfaces are utilized by the operator entity through the operator entity systems.

8. The system of claim 5, wherein the one or more processing components are further configured to:

determine one or more routing factors for the routing of the interaction to the one or more resource entities; and store the one or more routing factors in a routing engine.

9. The system of claim 8, wherein the one or more routing factors comprise at least one of:

one or more operator entity conditions, wherein the one or more operator entity conditions are preferred routings of routing channels of the operating entity;

one or more organization entity conditions, wherein the one or more organization entity conditions are preferred routings of the routing channels of an organization performing the routing;

one or more acceptance factors, wherein the one or more acceptance factors comprise likelihood of acceptance of the interaction using the routing channels;

one or more security factors, wherein the security factor comprises security level of the routing channels;

one or more expenditure factors, wherein the one or more expenditure factors comprise expenditure levels for the operating entity or the organization entity based on the routing channels; or one or more speed factors, wherein the speed factor comprises the speed of the routing channels.

10. A computer implemented method for centralized resource routing and distribution, the method comprising:

receiving, by one or more processing components, an interaction notification for an interaction between a user and an operator entity, wherein the interaction notification is received through one or more operator entity systems;

receiving, by the one or more processing components, a selection indication that the user would like to utilize a resource pool of a resource entity for the interaction;

determining, by the one or more processing components, a resource pool interface, including at least required resource pool information for entering into the interaction using the resource pool, wherein the resource pool information is determined from a resource pool database or from communicating with one or more resource entity systems;

displaying, by the one or more processing components, the resource pool interface with the required resource pool information for the resource pool, wherein the resource pool interface is provided to the operator entity in place of one or more operator interfaces, and wherein the resource pool interface is provided through the one or more operator entity systems for display to the user on a user computer system or on the one or more operator entity systems;

receiving, by the one or more processing components, the required resource pool information for the resource pool;

authenticating, by the one or more processing components, the user for the resource pool, wherein the authentication occurs by accessing a user authentication database or by communicating with the one or more resource entity systems;

determining, by the one or more processing components, routing of the interaction for the resource pool based on a routing factor; and completing, by the one or more processing components, the interaction between the user, the operator entity, and the resource entity.

11. The method of claim 10, further comprising:

providing, by the one or more processing components, a resource selection interface to the user, wherein the resource selection interface is provided for the operator entity in place of the one or more operator interfaces, and wherein the resource pool interface is provided through the one or more operator entity systems for display to the user on the user computer system or on the one or more operator entity systems;

providing, by the one or more processing components, resources distribution options for one or more resource pools or one or more resource entities in the resource selection interface to the user for the interaction.

12. The method of claim 11, wherein the one or more resource entities are one or more digital resource entities; and wherein receiving the selection indication that the user would like to utilize the resource pool for the interaction comprises receiving a selection of one of the one or more resource pools available through the one or more digital resource entities.

13. The method of claim 10, wherein the interaction is one of a plurality of interactions that the operator entity has entered into with a plurality of users that utilize a plurality of resource entities, and wherein the method further comprises:

aggregating, by the one or more processing components, the plurality of interactions and a plurality of interaction information for the plurality of interactions with the plurality of resource entities into a report; and sending, by the one or more processing components, the report to the operator entity, wherein the report is provided through the one or more operator entity systems.

14. The method of claim 10, further comprising:

identifying, by the one or more processing components, one or more resource pools or one or more resource entities that the operator entity would like to offer to a plurality of users; and creating, by the one or more processing components, one or more substitute interfaces for the operator entity to present to the plurality of users in place of the one or more operator interfaces, wherein the one or more substitute interfaces at least comprise the resource pool interface.

15. The method of claim 14, wherein the one or more substitute interfaces comprise one or more mimic interfaces, wherein the one or more mimic interfaces mimic the one or more operator interfaces provided by the operator entity.

16. The method of claim 14, wherein the one or more substitute interfaces comprise one or more universal interfaces, wherein the one or more universal interfaces are utilized by the operator entity through the operator entity systems.

17. The method of claim 14, wherein the method further comprises:

determining, by the one or more processing components, one or more routing factors for the routing of the interaction to the one or more resource entities; and storing, by the one or processing components, the one or more routing factors in a routing engine.

18. The method of claim 17, wherein the one or more routing factors comprise at least one of:

one or more operator entity conditions, wherein the one or more operator entity conditions are preferred routings of routing channels of the operating entity;

one or more organization entity conditions, wherein the one or more organization entity conditions are preferred routings of the routing channels of the organization performing the routing;

one or more acceptance factors, wherein the one or more acceptance factors comprise likelihood of acceptance of the interaction using the routing channels;

one or more security factors, wherein the security factor comprises security level of the routing channels;

one or more expenditure factors, wherein the one or more expenditure factors comprise expenditure levels for the operating entity or the organization entity based on the routing channels; or one or more speed factors, wherein the speed factor comprises the speed of the routing channels.

19. A computer program product for centralized resource routing and distribution, the computer program product comprising at least one non-transitory computer-readable medium having computer-readable program code portions embodied therein, the computer-readable program code portions comprising:

an executable portion configured to receive an interaction notification for an interaction between a user and an operator entity, wherein the interaction notification is received through one or more operator entity systems;

an executable portion configured to receive a selection indication that the user would like to utilize a resource pool of a resource entity for the interaction;

an executable portion configured to determine a resource pool interface, including at least required resource pool information for entering into the interaction using the resource pool, wherein the resource pool information is determined from a resource pool database or from communicating with one or more resource entity systems;

an executable portion configured to display the resource pool interface with the required resource pool information for the resource pool, wherein the resource pool interface is provided to the operator entity in place of one or more operator interfaces, and wherein the resource pool interface is provided through the one or more operator entity systems for display to the user on a user computer system or on the one or more operator entity systems;

an executable portion configured to receive the required resource pool information for the resource pool;

an executable portion configured to authenticate the user for the resource pool, wherein authentication occurs by accessing a user authentication database or by communicating with the one or more resource entity systems;

an executable portion configured to determine routing of the interaction for the resource pool based on a routing factor; and an executable portion configured to completing the interaction between the user, the operator entity, and the resource entity.

20. The computer readable of claim 19, wherein the computer-readable program code portions further comprise:

an executable portion configured to provide a resource selection interface to the user, wherein the resource selection interface is provided for the operator entity in place of the one or more operator interfaces, and wherein the resource pool interface is provided through the one or more operator entity systems for display to the user on the user computer system or on the one or more operator entity systems; and an executable portion configured to provide resources distribution options for one or more resource pools or one or more resource entities in the resource selection interface to the user for the interaction.

\* \* \* \* \*